United States Patent
Morita et al.

(10) Patent No.: US 7,425,687 B2
(45) Date of Patent: Sep. 16, 2008

(54) VACUUM INSULATED SWITCHGEAR

(75) Inventors: Ayumu Morita, Hitachi (JP); Kenji Tsuchiya, Hitachi (JP); Takuya Kurogi, Hitachi (JP); Masato Kobayashi, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/515,047

(22) Filed: Sep. 5, 2006

(65) Prior Publication Data

US 2007/0000876 A1   Jan. 4, 2007

Related U.S. Application Data

(63) Continuation of application No. 11/197,585, filed on Aug. 5, 2005, now abandoned.

(30) Foreign Application Priority Data

Aug. 17, 2004   (JP) .............................. 2004-237382

(51) Int. Cl.
*H01H 33/66* (2006.01)
(52) U.S. Cl. .................. 218/120; 218/140; 218/154
(58) Field of Classification Search ............... 218/2–14, 218/78, 84, 92, 118–120, 140, 153, 154
See application file for complete search history.

(56) References Cited

U.S. PATENT DOCUMENTS

| | | | |
|---|---|---|---|
| 5,510,590 A * | 4/1996 | Hux ............................. 218/6 |
| 6,242,708 B1 | 6/2001 | Marchand et al. | |
| 6,373,675 B1 | 4/2002 | Yamazaki et al. | |
| 6,870,451 B1 | 3/2005 | Inoue | |
| 6,881,917 B2 | 4/2005 | Kikukawa et al. | |
| 6,884,940 B1 * | 4/2005 | Utsumi et al. ............... 218/118 |
| 6,951,993 B2 * | 10/2005 | Kikukawa et al. ........... 218/118 |
| 2003/0192860 A1 * | 10/2003 | Kikukawa et al. ........... 218/118 |
| 2005/0139579 A1 | 6/2005 | Sakamoto et al. | |
| 2006/0007623 A1 * | 1/2006 | Trivette et al. ............... 361/115 |

FOREIGN PATENT DOCUMENTS

| | | |
|---|---|---|
| DE | 3 421 265 | 12/1984 |
| EP | 0 871 192 | 10/1998 |
| EP | 1 020 970 | 7/2000 |
| EP | 1 047 169 | 10/2000 |
| EP | 1355336 A2 * | 10/2003 |
| FR | 2 586 868 | 3/1987 |
| GB | 2 143 089 | 1/1985 |
| JP | 2000-268686 | 9/2000 |
| WO | WO 00/69041 | 11/2000 |

* cited by examiner

*Primary Examiner*—Elvin Enad
*Assistant Examiner*—Marina Fishman
(74) *Attorney, Agent, or Firm*—Mattingly, Stanger, Malur & Brundidge, P.C.

(57) ABSTRACT

A vacuum insulated switchgear comprising: a vacuum container; a vacuum insulated switch having a movable contact connected to a movable electrode and a fixed contact connected to a fixed electrode for interrupting and closing current; an operating rod connected to the movable electrode and connected to a magnetic drive mechanism; and a connecting mechanism for operating the operating rod; wherein the magnetic drive mechanism and the connecting mechanism are aligned on a straight line, wherein each of the magnet drive mechanisms has a shape of a rectangular parallelopiped shape.

16 Claims, 11 Drawing Sheets

VACUUM INSULATED SWITCHGEAR

This application is a continuation of U.S. patent application Ser. No. 11/197,585, filed Aug. 5, 2005, now abandoned which is incorporated by reference herein in its entirety.

CLAIM OF PRIORITY

This application claims priority from Japanese application serial No. 2004-237382, filed on Aug. 17, 2004, the content of which is hereby incorporated by reference into this application.

FIELD OF THE INVENTION

The present invention relates to a fully vacuum insulated type vacuum switchgear, and more particularly to a technology for space saving and improving assembly of a vacuum insulated switchgear.

RELATED ART

Vacuum switchgears are used in power transmission lines, which are called metal-clad type switchgears. The switchgears as disclosed in patent document No. 1 comprise a metal box which accommodates vacuum circuit breakers for interrupting load current or failure current. The metal-clad type switchgears are provided with a disconnector and an earth switch for securing safety of operators at the time of inspection and/or maintenance of the load, detectors for line voltage or current, protection relays, etc.

Though there are various types of insulation systems for vacuum switchgears, in fully vacuum insulated switchgears, an earthed vacuum container encloses a plurality of switches, such as a circuit breaker, a disconnecting switch, a load break switch and/or earthing switch, so that the vacuum switch portion is remarkably downsized.

Patent document No. 1: Japanese patent laid-open 2000-268686

The plural switches are enclosed in a single vacuum container to downsize the switchgear; in order to downsize the vacuum switchgear system, driving mechanisms for driving the respective switches should be downsized.

As the switchgear is downsized, operation efficiency of assembly and inspection and/or maintenance decreases, in general. Accordingly, switchgears that do not hinder the operation efficiency or assembly efficiency are desired.

SUMMARY OF THE INVENTION

The present invention aims at saving installment area of the vacuum switchgear by downsizing it, without decreasing efficiency of assembly and maintenance operation.

A vacuum insulated switchgear of the present invention comprises a plurality of vacuum insulated switchgear modules; each comprising,
a vacuum container;
a vacuum insulated switch having a movable contact connected to a movable electrode and a fixed contact connected to a fixed electrode for interrupting and closing current;
an operating rod connected to the movable electrode and connected to a magnetic drive mechanism; and
a connecting mechanism for operating the operating rod;
wherein the magnetic drive mechanism and the connecting mechanism are aligned on a straight line, wherein the magnet drive mechanism has a shape of a rectangular parallelopiped shape.

EMBODIMENTS FOR PRACTICING THE INVENTION

Figure 1:
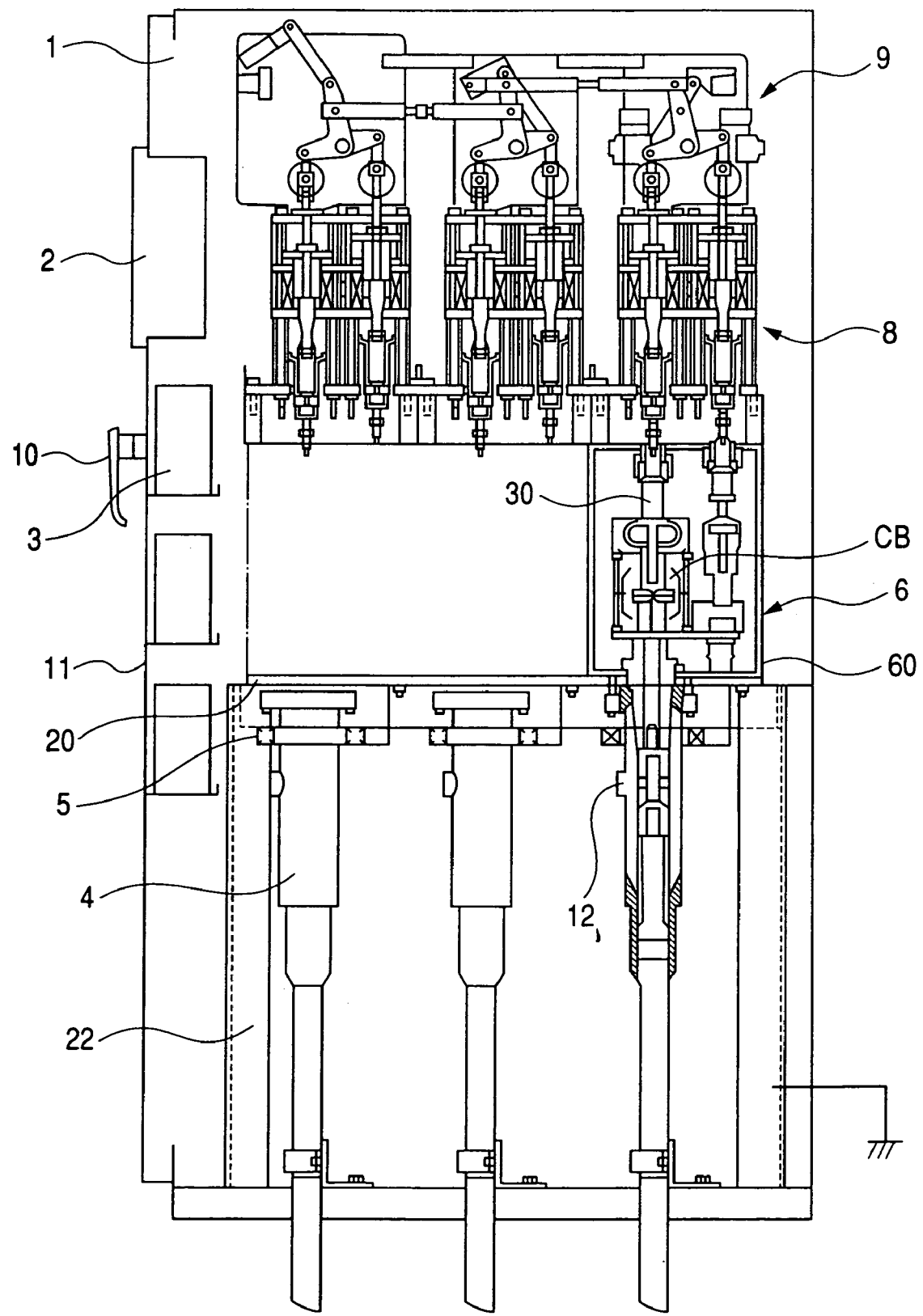
FIG. 1 is a side cross sectional view of an inside structure of a vacuum insulated switchgear of one embodiment according to the present invention.

The present invention provides a vacuum insulated switchgear comprising a plurality of single phase vacuum switchgear modules each comprising a vacuum container, a vacuum switch having switch contacts and operating rods for driving the switch contacts, and magnetic drive mechanisms each having driving rods for driving the operating rods by electromagnetic force and a spring force in upward and downward directions. The magnetic drive mechanisms are mounted above the vacuum switch components.

That is, the vacuum switch mechanisms section and the magnetic drive mechanisms are stacked in two stages thereby to save the installment area and downsize the switchgear. Since each of the three phases is formed into a module, assembly, inspection and/or maintenance of the switchgear can be conducted for each of the single phase modules. Therefore, in constituting the three phase vacuum switchgear system, efficiency of assembly, inspection and/or maintenance is not lowered.

The present invention can be applied to a case where a plurality of switch contacts such as a vacuum circuit breaker, a load break switch, an earthing switch, etc. are accommodated in a single vacuum container. For example, movable contacts of the vacuum circuit breaker and the load break switch are commonly connected, and earthing switches for earthing fixed contacts of the vacuum circuit breaker and the load break switch are enclosed in the single vacuum container. In this case, the plural switches are arranged side by side in the vacuum container, and a plurality of magnetic drive components are disposed side by side above the corresponding switches.

Particularly, the vacuum container is formed in a rectangular parallelopiped; the plural switch components are arranged in the vacuum container in a straight line. The plural drive mechanisms for driving the switch contacts are arranged in accordance with the switch contacts. Each of the drive mechanisms comprises a plurality of plungers connected to the upper end of the driving rods and a magnet and spring for driving the plungers upward and downward. In this case, by forming the outer shape of the drive members, it is possible to utilize the installment space effectively and a necessary magnetic force is generated in a small install area.

On the other hand, the switching operation of the earthing switches for earthing the contacts of the vacuum circuit breakers is carried out in such a manner that the operation direction of the earthing switches is opposite to that of the contacts of the vacuum circuit breakers by electrically interlocking the drive mechanisms. In addition to the electrical interlocking, a mechanical interlocking mechanism is required from the view-point of safety. In this case, connecting mechanism components for limiting the switching of the vacuum circuit breakers and the earthing switches are mounted above the magnetic drive mechanisms.

Each of the interlock mechanisms of the connecting mechanisms comprises a shaft extending horizontally a distance between the driving rods for driving the vacuum circuit breakers and earthing switches, two levers rotatably supported to the shaft, two pins connecting one ends of the driving rods of the vacuum circuit breakers and the earthing switches, and limiting members, connected to the other end of the levers, for limiting the swing movement of the other lever in the closing direction of the closing of the vacuum circuit breakers and the earthing switches.

By disposing three vacuum switchgear modules for three phases of the present invention in the single vacuum container of the metal-clad type switchgear, the three-phase vacuum insulated switchgear system can be easily assembled. In this case, switching operation of the vacuum circuit breakers, load break switches, disconnecting switches, etc must be synchronized. It is preferable that the switches are not only electrically synchronized, but also mechanically synchronized.

It is preferable to dispose the connecting mechanisms for securing three-phase synchronous operation of the vacuum switchgears. In this case, the basic concept of the single-phase module is maintained. In the connecting mechanisms of the present invention, the connecting mechanisms are constituted by a shaft extending in the direction traversing the direction of arrangement of the single phase modules for three phases, and levers rotatably connected by means of pins to the driving members connected to one end of the driving rods, wherein the adjoining connecting units in three phase arrangement are connected by means of extensible links to the connecting rods, which are connected to the pins connected to the other ends of the levers.

As a result, if the three drive levers for driving the switches of each phase are connected, the operation of the respective switches are synchronized. However, since it is impossible to avoid assembling errors of the switches and the drive mechanisms, and other manufacturing error, the operation of the respective switches should be adjusted in accordance with the errors when assembling the single phase modules.

In the present invention, the drive levers of the adjoining single modules are connected by means of extensible links to the connecting rods. That is, by extending or contracting the links to substantially adjust the length of the connecting rods, the displacement of synchronous operation is absorbed. As a result, the three modules can operate synchronously.

Particularly, compared with the case where the three drive levers are connected in a line by a single connecting rod, since the adjoining drive levers are connected by a connecting rod, the position precision of the drive levers becomes loose.

According to the present invention, it is possible to downsize vacuum switchgears with a small installment space without decreasing efficiency of assembly, inspection and/or maintenance.

Figure 2:
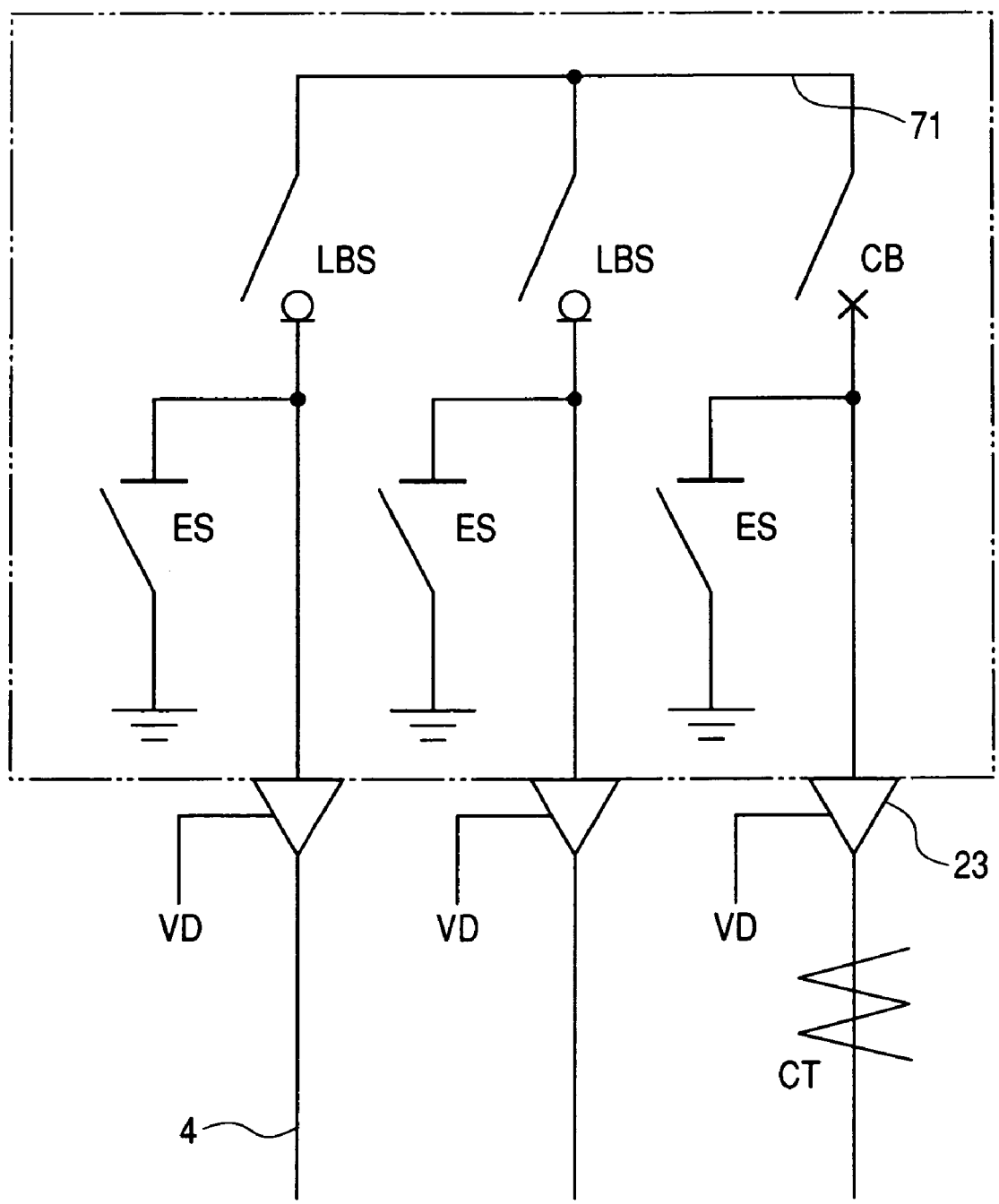
FIG. 2 is a single line-wiring skeleton of the vacuum insulated switchgear of the first embodiment shown in FIG. 1.

As shown in FIG. 2, each phase of the vacuum switchgear 1 of the present embodiment comprises a single circuit breaker CB, two load break switches LBS, and three earthing switches ES. The present invention is not limited to the embodiment shown in FIG. 2. The present invention can be applied to a case where there is a plurality of circuit breakers or to a case where there is a disconnecting switch I in addition to the other switches. In FIG. 2, the fixed contacts of the circuit breaker CB and load break switches LBS are connected to the cable 4, which are extended to outside of the vacuum container. The movable contacts of the circuit breaker CB and the load break switches LBS are commonly connected to a bus 71. Each of the cables 4 is provided with a voltage detection sensor VD, and the cable 4 of the circuit breaker CB is provided with a circuit transformer CT.

FIG. 1 is a side view of a vacuum switchgear 1 of the preset invention, which shows three switchgears for three phases. As shown in FIG. 1, the vacuum switchgear 1 comprises a protection relay 2 disposed to a door of the metal clad box, a condenser 3 used as a power source of the magnetic drive unit, a cable 4 for connecting the power source side and the load side, a measuring transformer 5 for measuring current and a voltage detector 12.

The vacuum switch means 6 each having a plurality of switch contacts are constituted by three vacuum containers 60 each being separated for each phase. Magnetic drive mechanisms 8 for driving the plural switch contacts are mounted above the vacuum containers 60, and connecting mechanisms 9 as link mechanisms for securing operation synchronism of the three phase contacts are mounted above the magnetic drive units 8 to constitute a three stage stack structure.

The inside of the vacuum switchgears can be inspected or maintained by turning the handle 10 to open the front door 11. The vacuum containers 60 accommodate a plurality of switch contacts shown in FIG. 2.

The reason why the vacuum containers 60 are separated for each phase is to avoid a serious accident caused by accidental excess current by limiting a trouble of one of the vacuum containers such as vacuum leakage to a single line earthing failure.

(Vacuum Switch Unit)

Figure 3:
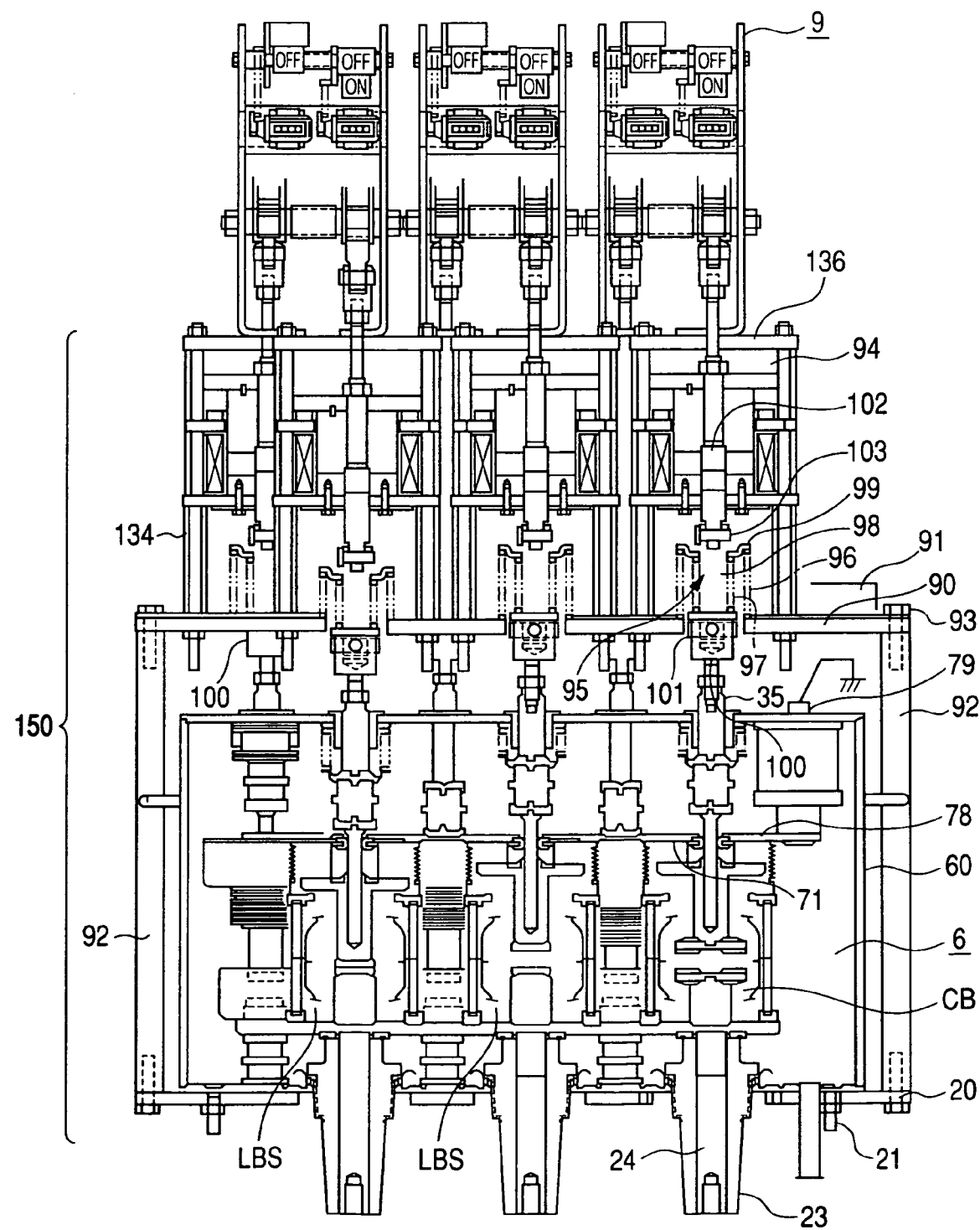
FIG. 3 is a front view of the vacuum insulated switchgear of the first embodiment shown in FIG. 1.
Figure 4:
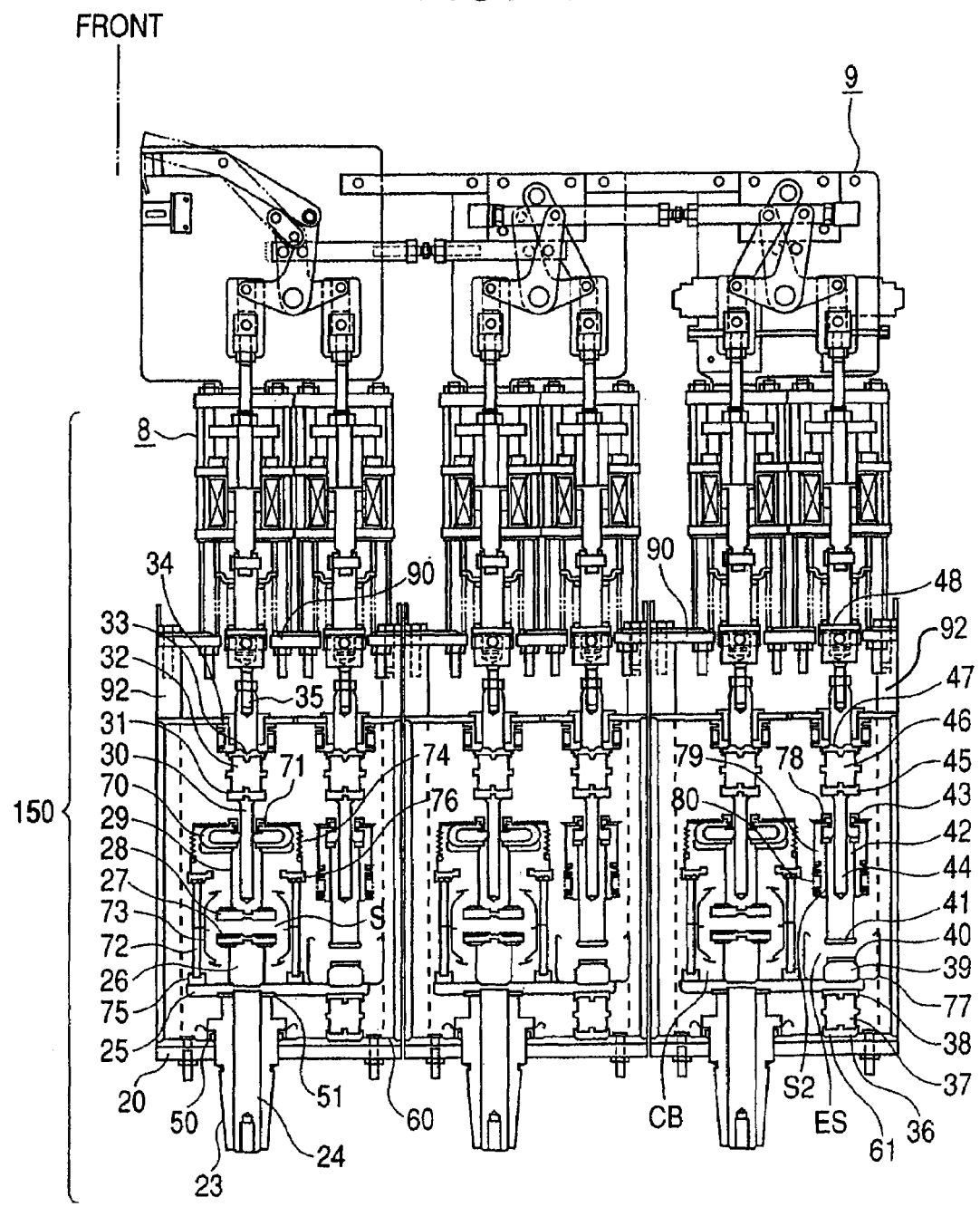
FIG. 4 is a side view of the inner structure of the first embodiment.

Next, the structure of the vacuum switch unit 6 will be explained by reference to FIGS. 3 and 4. FIG. 3 is a front view of the inner structure of the vacuum switchgear 1 and FIG. 4 is a side view of the inner structure of the vacuum switchgear. The vacuum container 60 is fixed to a base 20 by a fixing leg portion 22 shown in FIG. 1 with a bolt-nut 21. The bases 20 are separated from each other for the respective vacuum containers 60. The bases 20 are fixed separately. The three vacuum containers have the same structure, which are kept at the ground voltage. As a result, if an operator touches the vacuum container during the operation of the vacuum switchgear 1, the safety is secured.

Three cable connecting portions 23 made of ceramics protrude from the vacuum containers 60, into which cables 4 are inserted respectively. The cable connecting portions 23 are provided with feeders 24, which are fixed to conductive plates 25. The cable connecting portions 23 are fixed to the vacuum containers 60 by means of members 50 and connected to the conductive plates 25 by means of the members 51 to establish vacuum tightness.

The fixed conductors 26 connected to the fixed contacts 27 of the circuit breakers, the fixed conductors 39 connected to the fixed contacts 40 of the earthing switch and the insulating supporters 37 connected to the members 36 are fixed to the conductive plates 25. The insulating supporters 37 are fixed to the vacuum container 60 by means of the members 36. The members are fixed by brazing in vacuum.

The members 51, 36, 38 to be brazed with the cable connecting portions 23 or the insulating supporters 37 have recess-and-projections 61 to relieve residual stress after brazing.

The vacuum circuit breaker CB has the fixed contact 27 and the movable contact 28 in opposite relation to each other. Opening and closing of the contacts makes the circuit open and close. The movable contact 28 is connected to the movable conductor 29 by brazing. The movable conductor 29 is strengthened by an operating rod 30 made of stainless steel.

The operating rod 30 is sandwiched by members 31, 32 for alleviating brazing stress, and is connected to the insulating supporter 32. The operating rod 30 is connected to the connecting member 35 of the magnetic operating mechanism 8 by means of the member 33. The member 33 is connected to a bellows 34, which is connected to the vacuum container 60 at its other end, whereby the movable contact 28 moves up and down, keeping vacuum.

The flexible conductor 70 connected to the movable conductor 29 is connected to a bus 71. The flexible conductor 70 is a laminate of thin copper plates. The flexible conductor 70 makes a stable current flow even when the movable contact moves. As shown in FIG. 3, the bus 71 is connected to the movable conductor of the load break switch LBS, to constitute the wiring shown in FIG. 2.

An arc shield 73 fixed to the ceramic cylinder 72 is formed around the fixed contact 27 and the movable contact 28. The ceramic cylinder 72 is fixed to the current plate 25 by means of a residual stress relieving member 75 at its end. The other end of the ceramic cylinder 72 is connected to the bus 71 by means of the residual stress relieving member 76 and a case 74. That is, the current plate 25, the residual stress relieving members 75, 76, the ceramic cylinder 72 and the case 74 constitute a space for the circuit breaker. This structure prevents lowering of withstanding voltage performance of the contacts 27, 28 by scattering and contamination of the inner face of the ceramic cylinder with metallic particles from the contacts at the time of interruption. The arc shield 73 prevents contamination of the inner face of the ceramic cylinder 72 with metallic particles.

On the other hand, the earthing switch ES is provided with the movable contact 41 in opposite relation to the fixed contact 40; when the contacts are closed, earthing of the circuit is conducted. The movable contact 41 is connected to the movable electrode 42, which is provided with the operating rod 44 made of stainless steel, as a center rod for strengthening the movable electrode 42. The operating rod 44 is fixed to the connecting member 48 of the magnetic drive mechanism by means of the insulating supporter 46 and the residual stress relieving members 45, 47.

The shield 77 disposed to surround the fixed contact 40 and the movable contact 41 is not needed under the normal operation, but if the contacts are accidentally closed during current flow in the main circuit, the shield 77 prevents a preceding arc from scattering outside the vacuum container, which leads to lowering of the withstanding voltage property.

The movable electrode 42 is connected with the flexible conductor 43, which is fixed to the earthing bus 78. As shown in FIG. 3, the movable contact 42 of the earthing switch ES is also connected to the bus 78 by means of the flexible conductor 43, the bus 78 being connected outside the vacuum container by means of the feeder.

As shown in FIG. 4, a space S2 is formed by a case 79 to surround the flexible conductor 43. Since the flexible conductor 43 is formed of laminated thin copper plates, minute copper particles may be generated by sliding the copper plates at the time of switching operation. An area where the particles scatter must be confined in the space S2 so as to avoid lowering of insulation reliability. The space S for the circuit breaker has the similar function.

As having been described, by integrating the plural switches in the vacuum container, the switchgear can be downsized; further, since the length of the conductor is shortened, current flow loss can be minimized. As is shown in the above embodiment, by separating the vacuum containers 60 for each phase, the failure is limited to only one line even when a vacuum leakage accident happens, thereby to suppress the accidental current.

(Magnetic Drive Unit)

Figure 5:
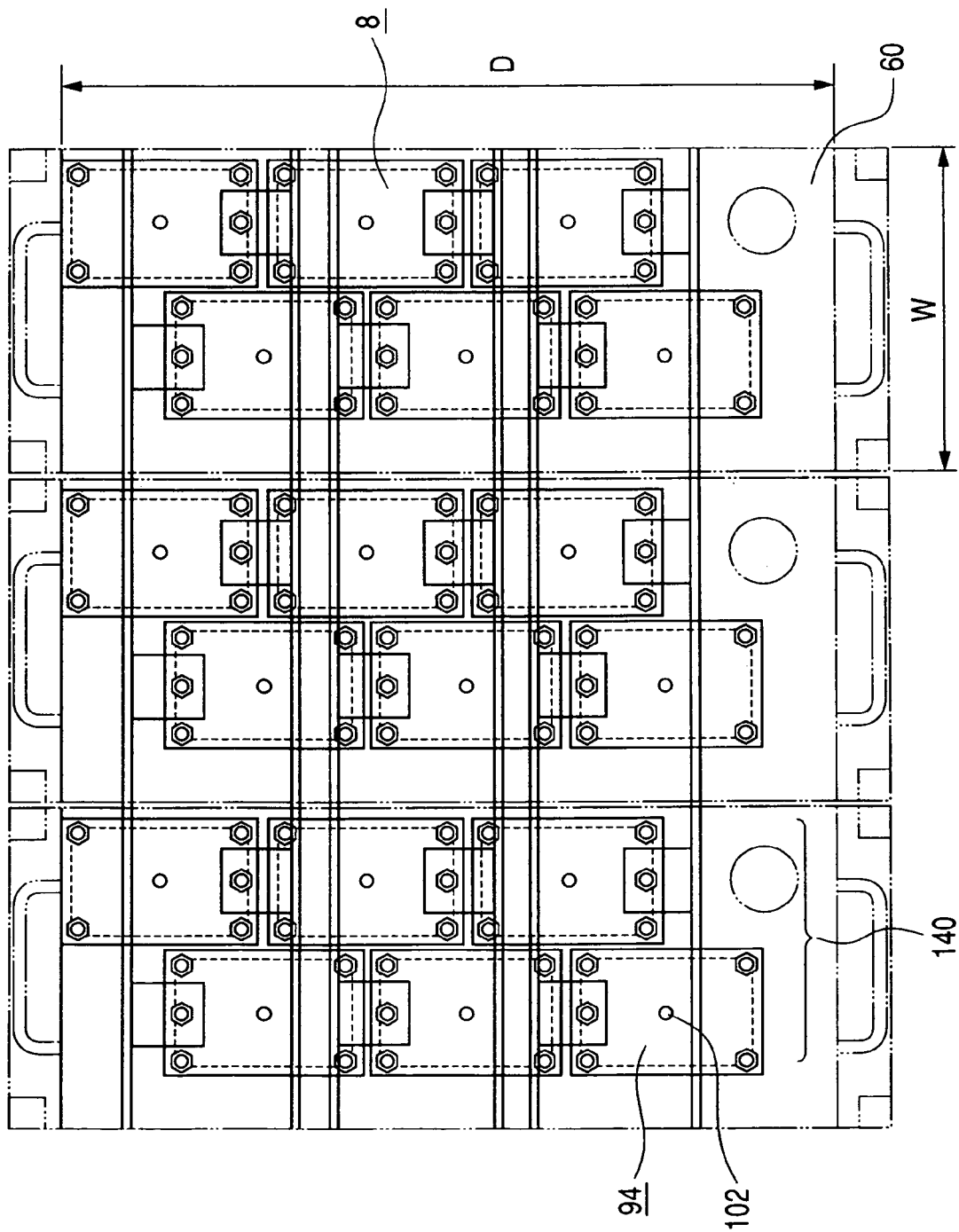
FIG. 5 is a top view of the magnet drive unit for explaining the operation mechanism.
Figure 6:
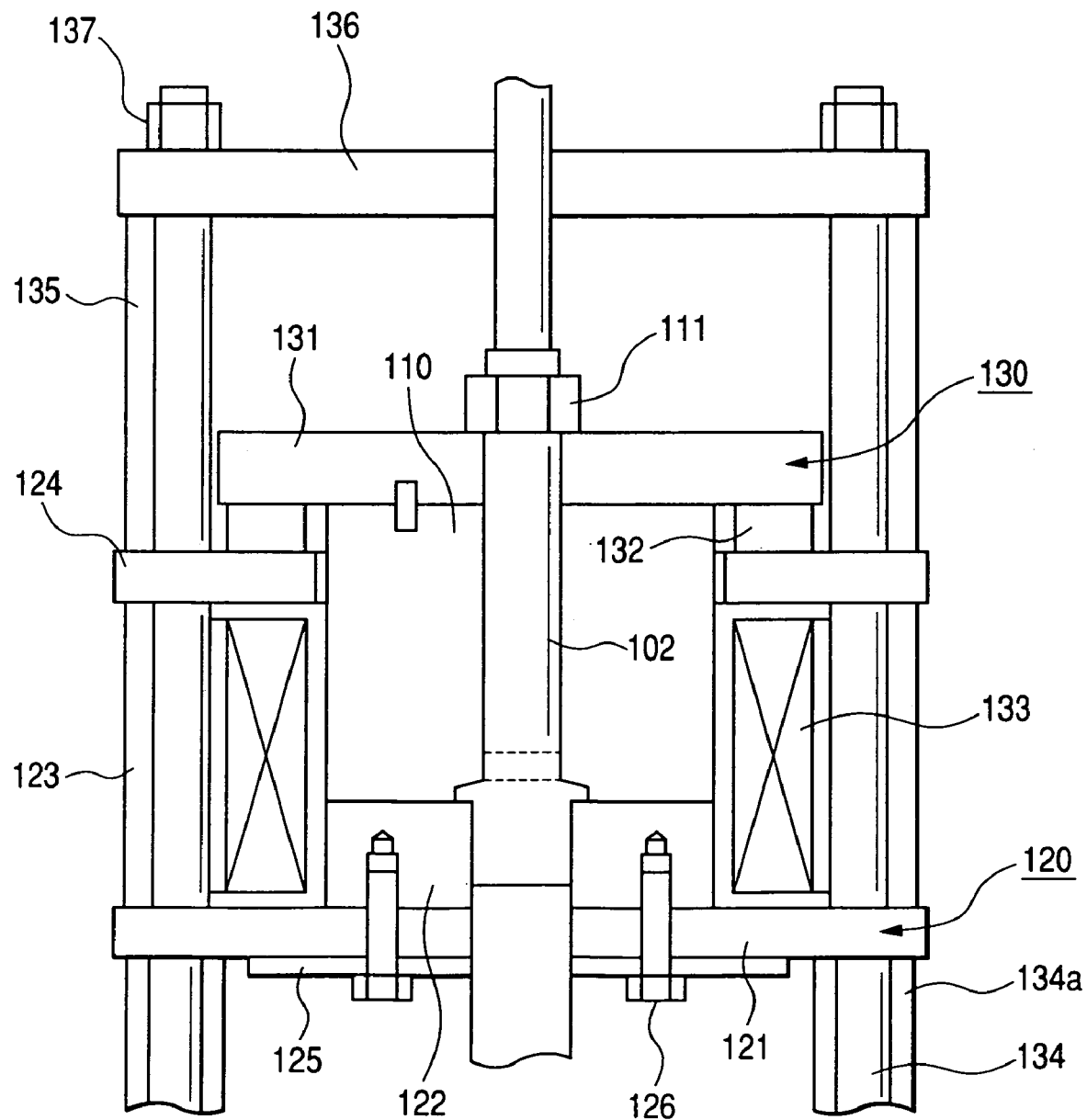
FIG. 6 is a cross sectional view of an electro-magnet for explaining the structure of the electro-magnet.

Next, the magnetic drive mechanism 8 will be explained by reference to FIGS. 3, 5 and 6. FIG. 3 is a front view of the vacuum insulated switchgear shown in FIG. 1. FIG. 5 is a top view of the magnetic drive mechanism 8, and FIG. 6 is a side view of the magnetic drive mechanism 8.

The magnetic drive mechanism 8 comprises an electromagnet 94 for driving each of the movable contacts in the vacuum circuit breakers, a connecting unit 95, an interrupting spring 96 for separating the contacts, and a pressing spring 97 for imparting a contact force to the contacts. Driving mechanisms such as the electro-magnets 94, etc of the magnetic drive mechanisms 8 are arranged on a straight line with respect to the contacts and the movable conductors connected to the contacts in the vacuum container 60. By connecting the contacts and electro-magnets 94 on a straight line, shafts, levers, etc may be omitted. As a result, operation energy can be saved and the capacity or size of the electro-magnet 94 and the condenser 3 as a power source can be downsized.

Further, in the above embodiment, since the vacuum container 60, the magnetic operation mechanism 8, and the connecting mechanisms 9 are connected in order, the driving force of the magnetic drive mechanism 8 is effectively transmitted to the contacts in the vacuum container 60.

The connecting mechanism 95 comprises an intermediate metal 98 for engaging with the shaft 102 of the electromagnet 94 and a pin 103, and a connecting member 100 fixed to the connecting member 35, which protrudes from the vacuum container. The interrupting spring 96 is sandwiched between a spring holding metal 99 connected to the intermediate metal 98 and the base 90; the interrupting spring 96 is compressed at the same time when the plunger 110 of the electro-magnet 94 is operated downward for closing the contacts.

On the other hand, the contact spring 97 is sandwiched between the spring holding metal 99 and connecting member 100. Since the shape of the hole into which the pin 101 of the intermediate metal 98 is inserted is elliptical, the connecting member 100 moves together with the plunger 110 until the fixed contact and the movable contact collide, and after collision, only the upper parts above the intermediate metal 98 move thereby to bias the contact spring 97 to impart a contact force to the contacts.

A construction and operation principle of the electro-magnet 94 will be explained in the following. FIG. 5 is a top view of the electro-magnet mechanism 8. The outer periphery of the electro-magnet 94 is rectangular.

The inner structure of the electro-magnet 94 is explained by reference to FIG. 6. FIG. 6 is a side cross sectional view of the electro-magnet 94. The fixed iron core 120 comprises a lower steel plate 121, a central leg 122, a rectangular steel pipe 123 and a permanent magnet stage 124. The central leg 122 is fixed together with the steel plate 125 by means of the lower steel plate 121 and the bolt 126.

The movable iron core 130 comprises a movable flat plate 131 and a plunger 110, a non-magnetic shaft 102 made of stainless steel, etc. penetrating the center of them. The permanent magnet 132 in opposite relation to the movable flat plate 131 is disposed. The permanent magnet 132 is fixed to the permanent magnet base 124 by means of an adhesive.

There is a gap (g) between the movable flat plate 131 and the permanent magnet 132 so that the permanent magnet 132 never moves to the movable flat plate 131 side. A coil 133 is disposed in the electro-magnet 94 to which exciting energy is supplied from the condenser 3 shown in FIG. 1.

The rectangular steel pipe 123 is made of JIS-G3466 defined as "rectangular pipe for general structural use", which is standardized, so as to reduce a cost. At the same time, the plunger 110, the coil 133, the permanent magnet 131, the movable flat plate 131, etc are formed rectangular. As is apparent from FIG. 5, the above-described structure has an improved space factor, compared with the conventional round shape electro-magnet. At the same time, the electro-magnet 94 is effectively arranged in accordance with the size of width (W) and the depth (D) of the electro-magnet 94.

The electro-magnet 94 is assembled in the following manner. At first, the lower steel plate 121 fixed with the bolt 126, the steel plate 125 and the central leg 122 are placed on a hexagonal portion 134a of the rectangular tube 134. The rectangular steel pipe 123, the coil 133 and the permanent magnet 132 are stacked on the permanent magnet table 124. They are fastened by the shaft 102 and a nut 111 to constitute the movable iron 130.

Finally, a permanent magnet cover 135 made of a rectangular steel pipe as same as the rectangular steel pipe 123 and an upper cover 135 are placed; then, they are fastened by the nut 137. As a result, the members are sandwiched between the nut 137 and the hexagonal portion 134a of the tube 134, whereby leakage of the magnetic field outside the electro-magnet 94 is reduced and the influence on the adjoining electro-magnets becomes negligible.

As shown in FIG. 3, the intermediate metal 98 is connected to the assembled electro-magnet 94 by means of the pin 103, and the tube 134 is fixed to the base 90, holding the interrupting spring 96 by the spring holding spring 99, the base 90 and the strengthening plate 91. If this assembly is applied 1:1 to the 6 electro-magnets 94 corresponding to the contacts in the vacuum container, the magnet drive mechanism modules are obtained as shown at 140 in FIG. 5.

Figure 7:
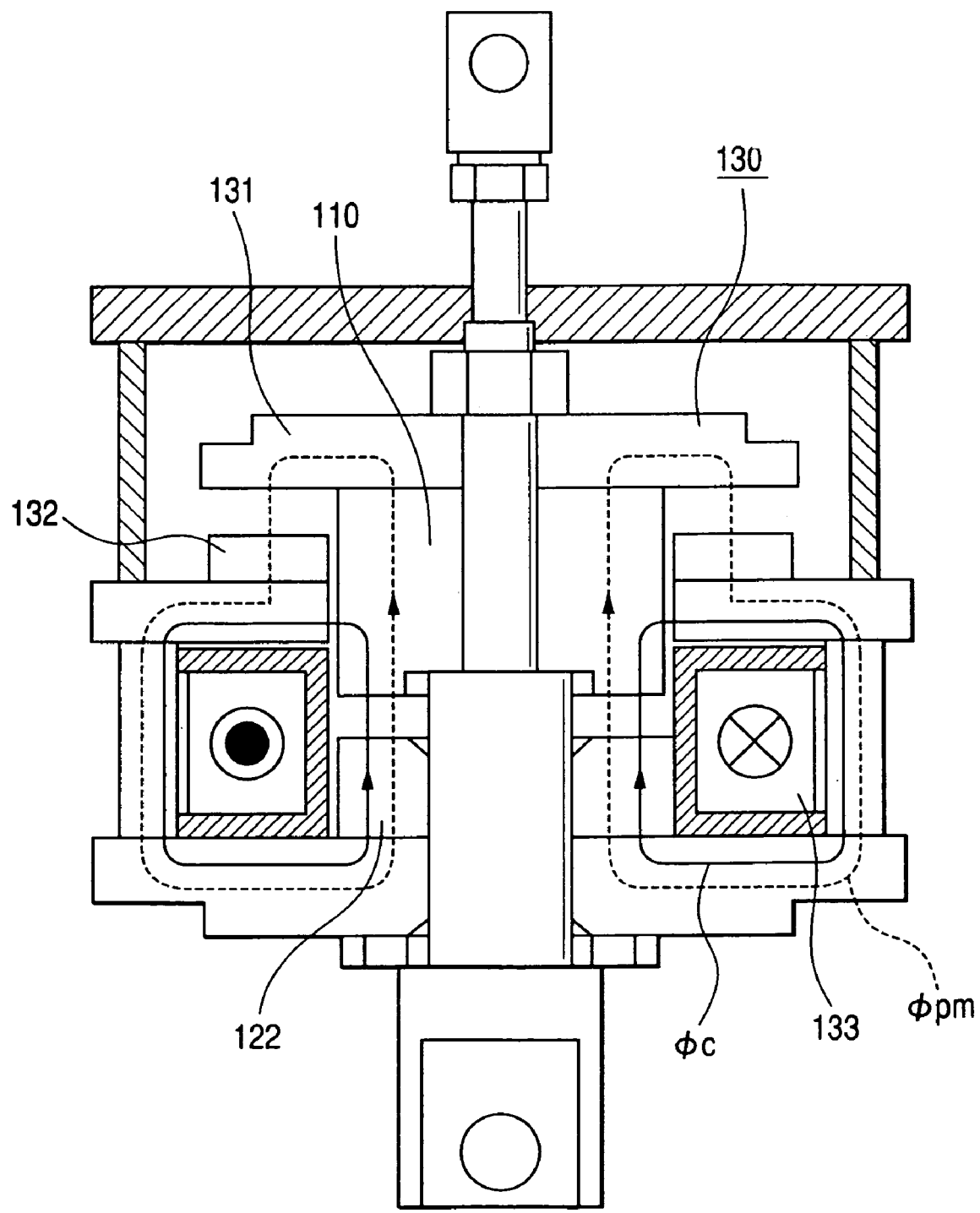
FIG. 7 is a diagrammatic view of an electro-magnet for explaining the operation.
Figure 8:
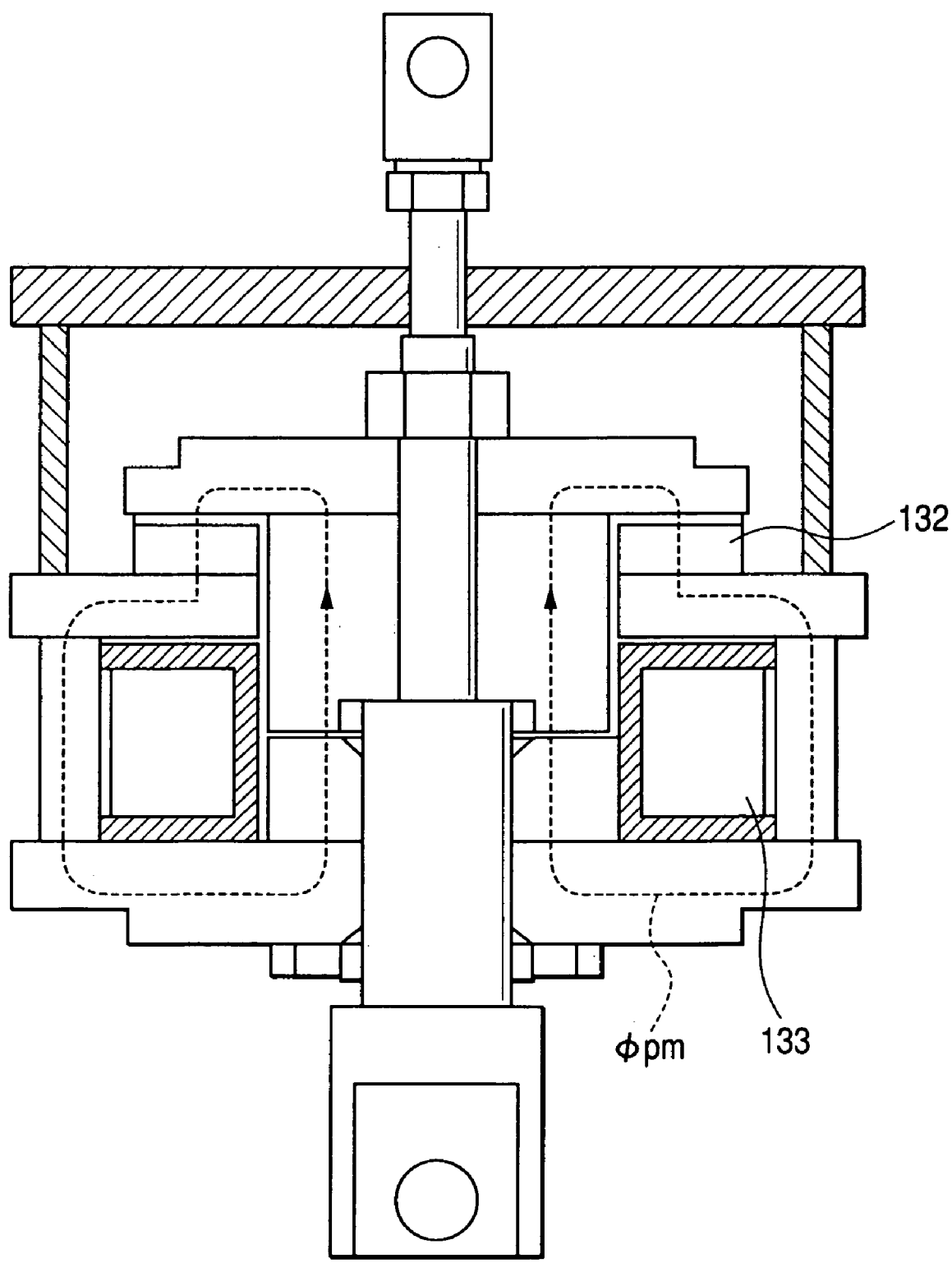
FIG. 8 is a diagrammatic view of another example of the electro-magnet for explaining the operation.
Figure 9:
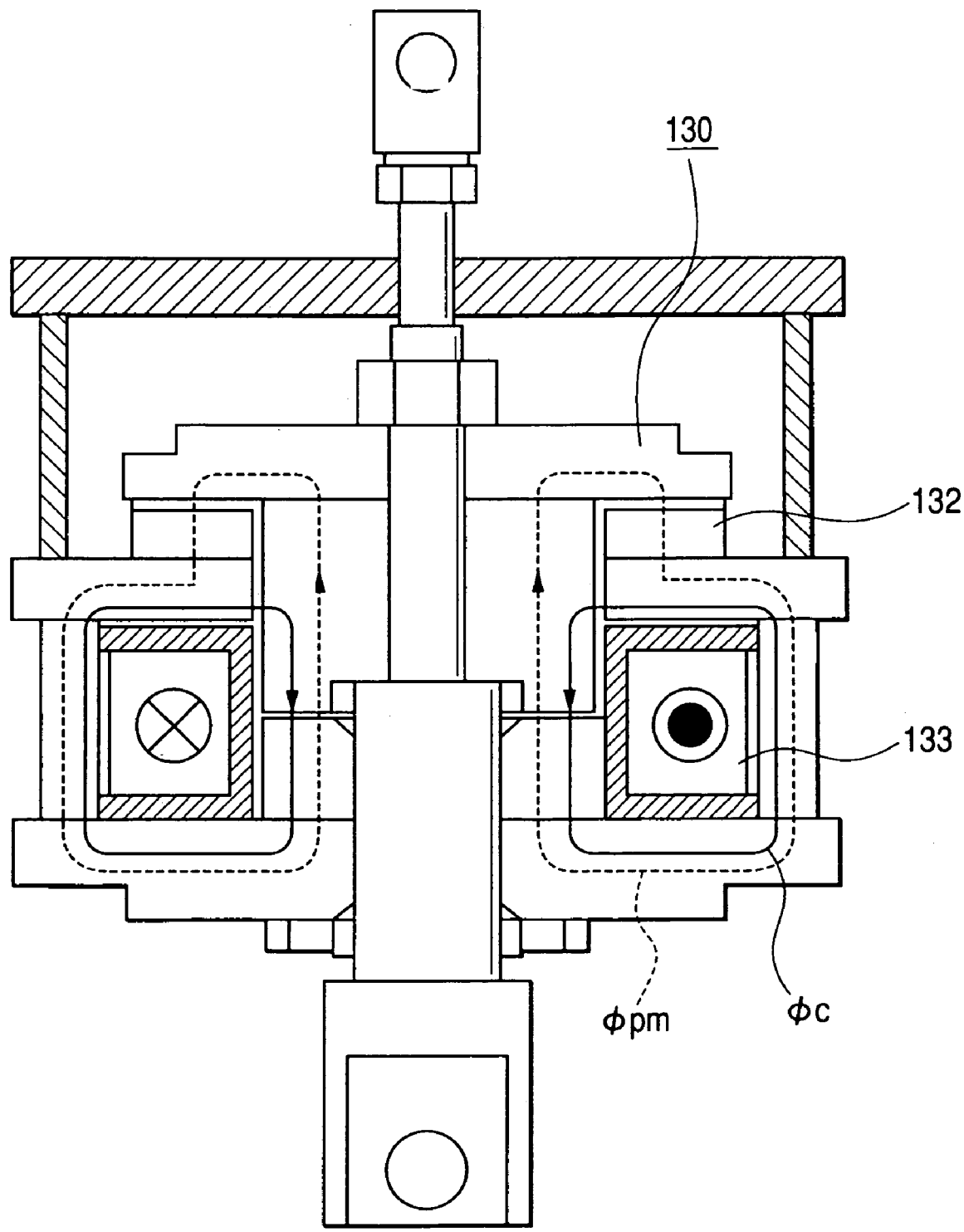
FIG. 9 is a diagrammatic view of a further example of the electro-magnet for explaining the operation.

The operation principle of the electro-magnet 94 will be explained by reference to FIGS. 7 to 9. FIG. 7, FIG. 8 and FIG. 9 show a closing operation, a retaining of the closing operation, and an opening operation, respectively. In the state of opened contacts, if the coil 133 is excited, an attractive force by the magnetic flux ($\phi$c) due to coil current is generated between the plunger 110 and the central leg 122 thereby to start to move the movable iron core 130 in the downward direction in the figure.

With the operation of the movable iron core 130, the movable contact in the connected vacuum container moves in the closing direction. In the state immediately before completion of the closing operation, since the flux ($\phi$pm) of the permanent magnet starts to act, an attractive force acts between the movable iron core 131 and the permanent magnet 132.

As is described above, the electro-magnet has the attractive force characteristics, which are equivalent to the spring force of the contact spring 97 from the time of the collision of the contacts in the vacuum container 60, wherein the spring force drastically increases from the time of collision.

When the closing operation is completed, magnetization of the coil 133 is released as shown in FIG. 8 and the closing state is maintained only by the attractive force of the permanent magnet 132. At this stage, the interrupting spring 96 and the contact spring 97 are biased to prepare for the opening operation.

In the opening operation, as shown in FIG. 9, current in a direction opposite to that in the closing operation is supplied. At this time, since the flux ($\phi$c) by the coil current acts to cancel the flux ($\phi$pm) by the permanent magnet, the attractive force of the electro-magnet 94 decreases. As a result, when the spring force of the interrupting spring 97 and the contact spring 96 is larger than that of the electro-magnet, the movable iron core 130 moves upward in the figure to open the contacts of the switch.

Next, a method of connecting the vacuum container 60 and electro-magnetic drive mechanism module 140 will be explained in the following. As shown in FIGS. 3 and 4, the base 20 of the vacuum container and the base 90 of the electro-magnetic drive mechanism module 140 are separated from those of the other phase; therefore, a single phase module 150 comprising the vacuum container 60 and the electro-magnetic drive mechanism module can be constituted. For example, the base 20 and the base 90 may be fixed by the connecting member 92. That is, three of the phase modules 150 are arranged, and the connecting means are disposed above the modules to constitute the vacuum switchgear 1.

Connection between the electro-magnetic drive mechanism 8 and the connecting member 35 extending from the vacuum container 60 will be explained by reference to FIG. 3. The electro-magnet 94 is in a closed position. The connecting member 100 and the nut 152 are connected to the connecting member 35, the base 90 is fixed to the connecting member 92 by means of the bolt 93, inserting the intermediate metal 98 into the connecting member 100 under the state that the contact spring 97 is inserted. At this time, the connecting member 100 is screwed into the connecting member 35 as much as possible so as to avoid the load of the contact spring 97.

After the above work is finished, the depth of screwing of the connecting metal 100 is adjusted so as to impart a predetermined load. After the adjustment, the pin 101 is screwed to complete connection between the electro-magnetic operation mechanism module 140 and the vacuum container 60 thereby to obtain a single phase module.

The following adjustment and tests before shipment of the module at the stage of the single phase module may be conducted. In general, vacuum circuit breakers are shipped after breaking-in operation followed by adjusting a contact spring load. The breaking-in operation is that non-load switching operation is repeated about 100 times, wherein the parallelism of the contacts is forcibly improved by utilizing the impact force at the collision of contacts.

Since the vacuum container 60 is assembled in a high temperature vacuum oven, the mechanical strengths of the respective members are different from those at room temperature. Particularly, the reduction in strength of the copper conductor used for current flow is remarkable. For example, the movable conductor 29 and the fixed conductor 26 are deformed in a shrinkage direction by the impact force. By the breaking-in operation, the switching operation is repeated until the deformation becomes saturated, and the contact spring load is adjusted after the operation before shipment.

In this embodiment, the breaking-in operation is conducted at the stage of the single phase module. After the phase modules 150 are assembled into a three phase switchgear, it is impossible to secure a space for work to adjust the contact spring load. In other words, by making the phase module of the vacuum insulated switchgear of the present invention, the space for adjustment is not necessary and the switchgear can be downsized as a whole. That is, the present invention aims not only at improving the working efficiency, but also at downsizing the switchgear.

The withstanding voltage tests of the vacuum switch 6 can be done at this stage. Since the vacuum container 60 of the vacuum insulated switchgear 1 is earthed, the electric field distribution in the container is not affected by other phases. If the withstanding voltage test of the phase module 150 can be done, attachment of cables 4 is easy and efficiency of the work increases.

As having been explained, since the vacuum container 60 and the electro-magnetic operation mechanisms 8 for driving the contacts therein are made into a module for each phase, the adjustment and various tests can be performed before shipment. Therefore, a work efficiency increases, and it is unnecessary to secure a space for the work; downsizing and reduced cost of the switchgear will be expected.

(Connecting Mechanisms)

Figure 10:
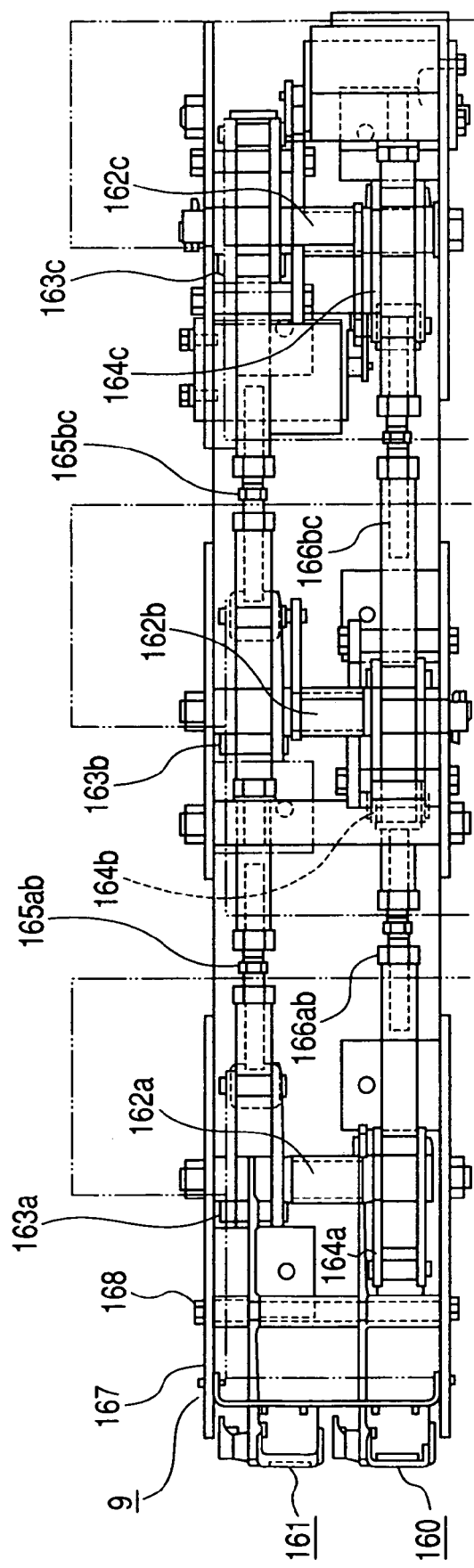
FIG. 10 is a top view of a connecting unit for switch contacts of a part of the three phase vacuum insulated switchgears.

Next, the connecting means 9 for constituting the connecting mechanism 9 for securing three-phase synchronism of the switching operation will be explained by reference to FIGS. 10 and 11. FIG. 10 is a top view of the connecting means of a part of the switch contacts for three phases, and FIG. 11 is its side cross sectional view.

The connecting means 9 has a unit comprising a connecting means 161 for the circuit breaker CB or the load break switch LBS and a connecting means 160 for the earthing switch ES. There are three units of connecting means in the vacuum insulated switchgear 1.

Figure 11:
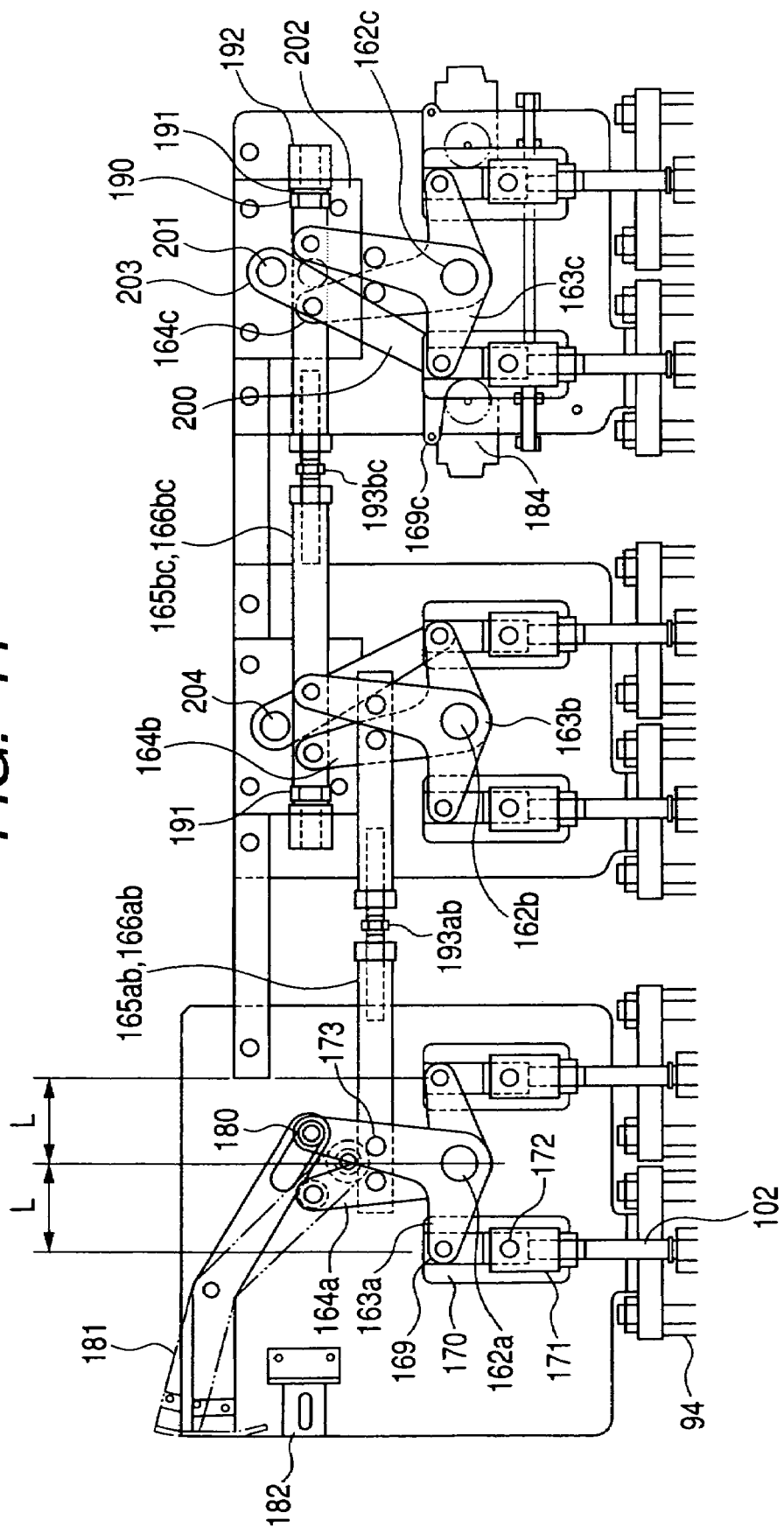
FIG. 11 is a side view of the switchgears shown in FIG. 10.

As shown in FIGS. 10 and 11, one of the units of the connecting means comprises three main shafts 162*a*, 162*b*, 162*c*, levers 163*a*, 163*b*, 163*c*, 164*a*, 164*b*, 164*c* for rotating around the shafts and connecting members 165*ab*, 165*bc*, 166*ab*, 166*bc* for connecting the respective levers. The suffixes a, b and c represent phase A, phase B and phase C, respectively. The levers 163*a*, 163*b*, 163*c* are of the circuit breakers CB or the load break switches, and the levers 164*a*, 164*b* and 164*c* are of the earthing switches ES.

The main shafts 162*a*, 162*b*, 162*c* are fixed by the nuts 168 using brackets 167 for both sides. The brackets 167 are fixed to the upper cover 136 of the electro-magnet 49 by means of bolts. The lever 163*a* that rotates around the main shaft 162*a* is connected to the shaft 102 of the electro-magnet 49 by means of the pin 169, the intermediate link 170, the pin 172 and the connecting member 171.

The lever 163*a* is connected to the lever 163*b* of phase B by means of pin 173 and the connecting member 165*ab*. The levers 163*b*, 163*c* of phase B and phase C are connected to the electro-magnet 49 and connected to the lever 163*a* of phase A. Connection of the connecting means 160 of the earthing switch ES to the lever and the electro-magnet 49 is the same as the above.

The main shafts 162*a*, 162*b*, 162*c* are located at the center between the main shaft 102 of the electro-magnet for the circuit breaker CB or the load break switch LBS and the shaft 102 of the electro-magnet for the earthing switch ES. For example, the length L of right side and left side in FIG. 11 should be equal. As a result, the levers 163*a*, 163*b*, 164*a*, 164*b*, 164*c* and four connecting members 165*ab*, 165*bc*, 166*ab*, 166*bc* are the identical parts, which leads to the cost reduction.

A status indicator 181 shown in FIG. 11 is connected to the lever 163*a* of the circuit breaker CB or the load break switch LBS by means of the pin 180; the status indicator 181 is connected to an operation number meter 182 by means of the spring 183. The operator is able to know the status of the vacuum switchgear by the position of the indicator. In synchronism with the connecting means 9, the status indicator 181 and the operation number meter 182 operate. Further, the lever 163*c* is connected to the auxiliary switch 184. This structure is the same as in the earthing switch ES.

In driving the respective contacts independently, the status display panel 181, the operation number meter 182 and the auxiliary switch 184 have been disposed for each of the operation mechanisms in the conventional switchgears. However, in the present embodiment, which utilizes the connecting means 9, only one of each element is needed for the whole switchgear. Wiring of the auxiliary switch becomes simplified in this embodiment.

Operation of the connecting means 161 for the circuit interrupter CB or the load break switch LBS will be explained by reference to FIG. 11. In closing operation, since the movable iron core 130 of the electro-magnet 49 moves downward, the levers 163*a*, 163*b*, 163*c* rotate in an anti-clockwise direction. According to this, the connecting members 165*ab*, 165*bc* move in the left direction. Since a stop position is decided by the collision point between the plunger 110 of the electro-magnet 49 and the central leg 122, a stopper for the closing operation is not necessary for the connecting means 161.

On the other hand, in opening operation of the contacts, since the movable iron core 130 of the electro-magnet 49 moves upward, the levers 163*a*, 163*b*, 163*c* rotate in a clockwise direction. According to this, the connecting portions 165*ab*, 165*bc* move in the right hand direction. A distance of opening operation is adjusted by inserting an adjusting plate 191 between the stopper bolt 190 and its seat 192; discrepancy between the phases is adjusted by turn-buckles 193*ab*, 193*bc*, which are extensible connectors, disposed to the connecting members 165*ab*, 165*bc*.

On the other hand, operation of the connecting means 160 for the earthing switch ES is in the opposite direction to that of the connecting means 161, since the connecting means 160 is disposed at the center position between the shaft 102 of the circuit breaker CB or of the load break switch LBS and the shaft 102 of the electro-magnet 49 of the earthing switch ES.

On the other hand, in opening operation, since the movable iron core 130 moves upward, the levers 164*a*, 164*b*, 164*c* rotate in an anti-clockwise direction, and the connecting members 166*ab*, 166*bc* move to the left hand. In the opening operation, the connecting member 166*bc* collides with the stopper bolt 190 to stop.

The reason why the operation direction of the connecting means 160 of the earthing switch ES is set to be opposite to that of the connecting means 161 of the circuit breaker CB or the load break switch LBS is that the number of parts can be reduced and the cost is reduced by parts sharing, and that the mechanical interlock, which will be explained in the following, is realized.

That is, the link member 200 is connected with the lever 163*c* and the pin 169*c*; in the state that the circuit breaker CB or the load break switch LBS is closed, the interlock pin 201 at the other end side moves within the elliptic hole 203 of the guide 202. At this status, if the earthing switch ES is tried to close, operation is impossible because the lever 163*c* interferes the interlock pin 201.

On the other hand, in the status where the earthing switch ES is closed, since the interlock pin 204 has moved downward, operation is impossible because the lever 162*b* interferes the interlock pin 204, if the circuit breaker CB or the load break switch LBS is closed.

As has been described, by making the operation directions of the connecting means 161 of the circuit breaker CB or the load break switch LBS and the connecting means 160 of the earthing switch ES opposite to each other, a mechanical interlock is easily realized to limit the swing of the connecting means in the closing directions, because the positions of the levers 163, 164 coincide with each other when one of the switches is in the closed state.

The main shaft 162 is shared for the connecting means, which aims at securing the three phase synchronism of the contacts according to the embodiment, for the circuit breaker CB or the load break switch LBS or the connecting means for the earthing switch ES, whereby the number of parts is reduced and a cost is lowered. Further, since the operation directions of the two are opposite to each other, a mechanical interlock is easily realized to improve safety and reliability.

As is explained above, the vacuum insulated switchgear 1 has a three stage stack of the vacuum switch 6, the magnetic operation mechanism 8 for independently driving the contacts in the vacuum container 6 and the connecting means 9 for securing the three phase synchronism of the switching operations; the installment area of the vacuum insulated switchgear is minimized to realize the compact and low cost switchgears. At the same time, the vacuum switch 6, the electro-magnetic operation mechanism 8 and the connecting means 9 are downsized.

The vacuum container 6 accommodates a plurality of switches having functions of the circuit breaker, the disconnecting switch, the load break switch or the earthing switch to make the switchgear compact.

The magnetic operation mechanism 8 utilizes rectangular steel pipes for the fixed iron cores to increase the space factor of the electro-magnet 94.

The magnetic operation mechanism 8, the contacts and the movable conductor fixed to the contacts are aligned on a straight line to omit parts such as shafts, levers for shifting the movement directions.

The switchgear of the present invention lowers a loss of operation energy to downsize the electro-magnet 94 and the condenser 3 as a power source.

Since the vacuum insulated switch 6 and the electro-magnetic operation mechanism 8 are formed into a module for each phase, adjustment and testing of the phase modules can be done before shipment to increase work efficiency. Further, it is not necessary to keep a space for the work.

The connecting means 9 makes a unit comprising the connecting means 161 for the circuit breaker, the disconnecting switch or the load break switch and the connecting means 160 for the earthing switch to thereby reduce the number of parts. The number of parts is reduced by sharing.

By arranging the main shafts 162a, 162b, 162c and levers 163a, 163b, 163c, 164a, 164b, 164c as in the present embodiment, a mechanical interlock is easily realized to improve safety and reliability.

What is claimed is:

1. A vacuum insulated switchgear comprising a plurality of single phase vacuum insulated switchgear modules, each of the single phase vacuum insulated switchgear modules comprising:
    a vacuum container;
    a vacuum insulated switch, accommodated in the vacuum container, having a movable contact connected to a movable electrode and a fixed contact connected to a fixed electrode for interrupting and closing current;
    an operating rod connected to the movable electrode and connected to a magnetic drive mechanism; and
    a connecting mechanism comprising a vertical connecting means and a lateral connecting means for connecting the operating rod together with the operating rods of other single phase vacuum insulated switchgear modules and for connecting together the connecting mechanisms of the vacuum insulated switchgear modules;
    characterized in that:
    the magnetic drive mechanism and the connecting mechanism are aligned on a vertical straight line of the vertical connecting means,
    each of the magnetic drive mechanisms has a rectangular parallelepiped shape when viewed from the top, and
    each of the single phase vacuum insulated switchgear modules is operable separately via the magnetic drive mechanism thereof before assembling the single phase vacuum insulated switchgear modules into the vacuum insulated switchgear by connecting together the lateral connecting means.

2. The vacuum insulated switchgear according to claim 1, wherein
    the magnetic drive mechanisms are located above the respective vacuum insulated switches of the vacuum insulated switchgear modules, and the connecting mechanisms are located above the respective magnetic drive mechanisms.

3. The vacuum insulated switchgear according to claim 1, wherein each of the magnetic drive mechanisms comprises a plunger connected to the upper end of a corresponding drive rod and a magnet, and a spring for driving the plunger.

4. The vacuum switchgear according to claim 1, wherein each of the vacuum containers is of rectangular parallelepiped shape, the switches are arranged side by side in the vacuum containers, the magnetic drive mechanisms are arranged in positions according to the respective switches, and magnets of the magnetic drive mechanisms are of rectangular shape.

5. The vacuum insulated switchgear according to claim 1, wherein each vacuum insulated switchgear module further includes a vacuum circuit breaker and a load break switch, and wherein each of the vacuum circuit breaker and load break switch is paired with a respective earthing switch.

6. The vacuum insulated switchgear according to claim 5, wherein each of the connecting mechanisms has an interlock mechanism for restricting the operation in the same direction of the vacuum circuit breaker and the earthing switch.

7. A vacuum insulated switchgear, which comprises:
    three vacuum containers of respective vacuum insulated switchgear modules for three phases, each containing a plurality of operating rods for operating up and down movable electrodes of respective vacuum insulated switches, ends of the operating rods being protruded from an upper wall of the vacuum container in which each operating rod is contained, wherein the operating rods are connected to the movable electrodes and to a plurality of electro-magnetic driving units, and wherein the electro-magnetic driving units are located above the vacuum insulated switches;
    connecting mechanisms each comprising a vertical connecting means and a lateral connecting means for connecting the operating rods of each vacuum insulated switchgear module with the operating rods of the other vacuum insulated switchgear modules and for connecting together the connecting mechanisms of the vacuum insulated switchgear modules;
    characterized in that:

each of the electro-magnetic driving units and a corresponding connecting mechanism of each vacuum insulated switchgear module are aligned on a vertical straight line of the vertical connecting means;

each of the electro-magnetic driving units has a rectangular parallelepiped shape when viewed from the top;

each of the vacuum insulated switchgear modules is operable separately via the electro-magnetic driving unit thereof before assembling the single phase vacuum insulated switchgear modules into the vacuum insulated switchgear by connecting together the lateral connecting means;

wherein the vacuum insulated switches include a vacuum circuit breaker and an earthing switch, and wherein each of the connecting mechanisms has an interlock mechanism for restricting the operation in the same direction of the vacuum circuit breaker and the earthing switch.

8. The vacuum insulated switchgear according to claim 7, wherein each of the driving units has a driving mechanism that comprises a plunger connected to the upper end of a corresponding drive rod and a magnet, and a spring for driving the plunger upward and downward.

9. The vacuum insulated switchgear according to claim 8, wherein the vacuum containers are of rectangular parallelepiped shape, the switches are arranged side by side in the vacuum containers, the electro-magnetic driving units are arranged in positions corresponding to the respective switches, and the magnets of the electromagnetic driving units are of rectangular shape.

10. The vacuum insulated switchgear according to claim 7, wherein one of the switches is a load break switch, and movable electrodes of the vacuum circuit breaker and the load break switch are each commonly connected to an earthing switch for earthing the fixed contacts of the vacuum circuit breaker and the load break switch.

11. The vacuum insulated switchgear according to claim 7, wherein link mechanisms having the interlock mechanism for restricting the opening of the vacuum circuit breaker and the earth switch are mounted above the electro-magnetic driving units.

12. The vacuum insulated switchgear according to claim 11, wherein each of the link mechanisms comprises a shaft extending horizontally above the distance between driving rods of the electro-magnetic driving units for driving the vacuum circuit breaker and the earthing switch, two levers rotatably supported to the shaft, two pins for connecting one ends of the levers to the members for moving with the driving rods of the vacuum circuit breaker and the earthing switch, and limiting members for limiting swing movement of the other lever in the closing direction.

13. A vacuum insulated switchgear comprising three single phase modules arranged in an arrangement direction and each comprising a vacuum switch which comprises a vacuum circuit breaker, an operating rod for driving up and down a movable contact of the vacuum circuit breaker and a vacuum container accommodating the vacuum circuit breaker and the operating rod, one end of the operating rod being protruded from the upper wall of the vacuum container, an electromagnetic driving section having a driving mechanism for driving a driving rod connected to the operating rod, and a connecting mechanism for driving the driving rod of the electro-magnetic driving section, wherein the electro-magnetic driving section is mounted on the vacuum switch, and the connecting mechanism is mounted on the electro-magnetic driving section; wherein the connecting mechanisms each comprise a shaft extending in the direction of the arrangement of the single phase modules;

wherein the connecting mechanism comprises a vertical connecting means and a lateral connecting means for connecting together the operating rods of the single phase modules and for connecting together the connecting mechanisms of the single phase modules;

wherein the driving mechanism and the connecting mechanism are aligned on a vertical straight line of the vertical connecting means;

wherein each of the electro-magnetic driving sections has a rectangular parallelepiped shape when viewed from the top;

wherein each of the single phase modules is operable separately via the electro-magnetic driving section thereof before assembling the single phase modules in to the vacuum insulated switchgear by connecting together the lateral connecting means; and wherein connecting rods of the respective adjoining connecting mechanisms are connected with each other by means of an extensible, shrinkable connector.

14. A vacuum insulated switchgear comprising three single phase modules arranged in an arrangement direction and each comprising a vacuum switch which comprises a vacuum circuit breaker, an operating rod for driving up and down a movable contact of the vacuum circuit breaker and a vacuum container accommodating the vacuum circuit breaker and the operating rod, one end of the operating rod being protruded from the upper wall of the vacuum container, an electro-magnetic driving section having a driving mechanism for driving a driving rod connected to the operating rod, and a connecting mechanism for driving the driving rod of the electro-magnetic driving section, wherein the electro-magnetic driving section is mounted on the vacuum switch, and the connecting mechanism is mounted on the electro-magnetic driving section; wherein the connecting mechanisms each comprise a lever connected to a member cooperatively driven with the driving rod pivotally supported by means of a pin to a shaft extending in the direction of the arrangement of the single phase modules, wherein the connecting mechanism comprises a vertical connecting means and a lateral connecting means for connecting together the operating rods of the single phase modules and for connecting together the connecting mechanisms of the single phase modules;

wherein the driving mechanism and the connecting mechanism are aligned on a vertical straight line of the vertical connecting means;

wherein each of the electro-magnetic driving sections has a rectangular parallelepiped shape when viewed from the top;

wherein each of the single phase modules is operable separately via the electro-magnetic driving section thereof before assembling the single phase modules in to the vacuum insulated switchgear by connecting together the lateral connecting means; and wherein connecting rods of the respective adjoining connecting mechanisms are connected with each other by means of an extensible, shrinkable connector.

15. The vacuum insulated switchgear according to claim 14, wherein the plural switches each further comprise an earthing switch for earthing a fixed contact of the vacuum circuit breaker, and the connecting mechanisms each comprise an interlock mechanism for restricting opening and closing the vacuum circuit breaker and the earthing switch.

16. The vacuum insulated switchgear according to claim 15, wherein the interlock mechanism comprises a shaft extending horizontally above the driving rods for driving the vacuum circuit breaker and the earthing switch, two levers supported pivotally to the shaft, two pins connected to the respective members cooperatively driven with the driving rods of the vacuum circuit breaker and the earthing switch, and a restricting member for limiting the swing movement in the closing direction of the levers at the closing position of the vacuum circuit breaker and the earthing switch.

* * * * *